US 11,866,907 B2

(12) United States Patent
Parry-Jones

(10) Patent No.: US 11,866,907 B2
(45) Date of Patent: Jan. 9, 2024

(54) SUPERSTRUCTURE

(71) Applicant: J. C. Bamford Excavators Limited, Uttoxeter (GB)

(72) Inventor: Ian Mark Parry-Jones, Uttoxeter (GB)

(73) Assignee: J. C. Bamford Excavators Limited, Uttoxeter (GB)

( * ) Notice: Subject to any disclaimer, the term of this patent is extended or adjusted under 35 U.S.C. 154(b) by 356 days.

(21) Appl. No.: 17/157,919

(22) Filed: Jan. 25, 2021

(65) Prior Publication Data
US 2021/0230832 A1 Jul. 29, 2021

(30) Foreign Application Priority Data
Jan. 24, 2020 (GB) ..................... 2001015

(51) Int. Cl.
*E02F 9/08* (2006.01)
*E02F 9/16* (2006.01)
*B62D 33/06* (2006.01)
*E02F 3/32* (2006.01)

(52) U.S. Cl.
CPC ........ *E02F 9/0808* (2013.01); *B62D 33/0617* (2013.01); *E02F 3/325* (2013.01); *E02F 9/16* (2013.01); *E02F 9/0866* (2013.01)

(58) Field of Classification Search
CPC ....... B62D 33/06; B62D 33/0617; E02F 3/32; E02F 3/325; E02F 9/0808; E02F 9/0866; E02F 9/16
USPC .................................. 296/190.01, 190.08
See application file for complete search history.

(56) References Cited

U.S. PATENT DOCUMENTS

| | | | |
|---|---|---|---|
| 6,206,121 B1 | 3/2001 | Michel | |
| 7,896,429 B2 * | 3/2011 | Kim ........................ | E02F 9/163 296/193.07 |
| 8,632,122 B2 * | 1/2014 | Kimura .............. | B62D 33/0617 296/190.01 |
| 2013/0313858 A1 | 11/2013 | Rager et al. | |
| 2014/0017054 A1 * | 1/2014 | Motozu ................... | E02F 3/325 414/687 |

(Continued)

FOREIGN PATENT DOCUMENTS

| EP | 0273796 A1 | 7/1988 |
|---|---|---|
| EP | 0426510 A1 | 5/1991 |

(Continued)

OTHER PUBLICATIONS

Search Report for GB 2001015.3, dated Jun. 10, 2020.

(Continued)

*Primary Examiner* — Jason S Daniels
(74) *Attorney, Agent, or Firm* — MARSHALL, GERSTEIN & BORUN LLP

(57) ABSTRACT

A superstructure for mounting upon a ground engaging structure of a working machine includes a cab structure for housing a human operator of the working machine; a chassis structure providing a base for the cab structure; and a frame including a tubular body, the tubular body comprising two legs and a cross member interposed between the legs, wherein the cross member is at a non-zero angle to both legs. The frame is connected to the cab structure proximate an upper extent of the frame and the chassis structure proximate a lower extent the frame so as to support a portion of the cab structure.

20 Claims, 6 Drawing Sheets

(56) References Cited

U.S. PATENT DOCUMENTS

2014/0301816 A1   10/2014  Kokuryo et al.
2015/0165875 A1*  6/2015  Uchida .................... B60H 1/32
                                                                           62/239

FOREIGN PATENT DOCUMENTS

| EP | 1138835 A1 * | 10/2001 | ............. E02F 3/325 |
| EP | 1767706 A2 | 3/2007 | |
| EP | 2757201 A2 | 7/2014 | |
| EP | 3015606 A1 | 5/2016 | |
| EP | 3351909 A1 * | 7/2018 | ........... B60K 15/063 |
| WO | WO-2011/025874 A1 | 3/2011 | |
| WO | WO-2013/154434 A2 | 10/2013 | |

OTHER PUBLICATIONS

Examination Report issued in GB 2001015.3, dated May 15, 2023.
Extended European Search Report issued in EP 21152852.6, dated May 31, 2021.

* cited by examiner

SUPERSTRUCTURE

FIELD

The present teachings relate to a superstructure, and in particular to a superstructure incorporating a frame for supporting a portion of a cab structure of a working machine.

BACKGROUND

Working machines are often used in construction, agriculture and other heavy industries to perform tasks that humans are unable to do or to perform tasks more quickly than a human. Examples of working machines include, but are not limited to, excavators, forklifts, backhoe loaders, telescopic handlers, tractors, loaders and dumpers. Working machines tend to comprise a cab mounted to a chassis for housing an operator of the machine.

In small-to-medium sized working machines, for example having operating weights of between 1 and 8 tonnes, it is common for a compartment for housing a prime mover such as an engine or an electric motor to be located adjacent the cab. In order to ensure that the machine is compact, a portion of the cab extends horizontally over the engine/motor compartment, such that a portion of the engine/motor compartment extends beneath the cab.

To support the horizontally extending portion of the cab, a frame is required to help transfer the mass of the extending portion of the cab to the chassis. Such a frame is required to be strong enough to not only support the mass of the cab and the operator, but also to withstand greater than normal structural forcing in the event that the machine rolls over. In such a roll over event, the frame needs to be capable of absorbing impact energy with a minimal amount of plastic deformation in order to protect the operator.

In the prior art, cab supporting frames tend to be formed from multiple plate-like components that may be bolted or welded together. These frames tend to be heavy since each of the plate-like components is required to be strong and stiff enough to withstand the aforementioned large structural forces. Disadvantageously, the large amount of material and labour required to manufacture these frames increases their cost to manufacture.

Present cab supporting frames tend to include three plate-like leg supports which are mounted to a chassis of a working machine and which extend upwardly towards the cab. When the frame supports a portion of a cab that extends horizontally over an engine/motor compartment, the frame's leg supports are required to extend adjacent to components of the engine/motor. Commonly, frames are designed such that one or more of the leg supports is located between a service hatch of the compartment and the components of the engine/motor. Such frame designs are disadvantageous since they may hinder service access to the engine/motor components and hence make servicing or repair of the engine/motor awkward. Further, prior art frames comprising three leg supports may reduce the space available in the engine/motor compartment for engine/motor components since space may be required for accommodating one or more of the leg supports within the compartment.

The present teachings seek to overcome, or at least mitigate the problems of the prior art.

SUMMARY OF THE INVENTION

According to a first aspect of the present teachings, there is provided a superstructure for mounting upon a ground engaging structure of a working machine. The superstructure comprises: a cab structure for housing a human operator of the working machine; a chassis structure providing a base for the cab structure; and a frame comprising a tubular body, the tubular body comprising two legs and a cross member interposed between the legs, wherein the cross member is at a non-zero angle to both legs. The frame is connected to the cab structure proximate an upper extent of the frame and the chassis structure proximate a lower extent the frame so as to support a portion of the cab structure.

Advantageously, the tubular body is capable of elastically deforming during, for example, a roll-over event of the working machine, allowing the body to absorb more energy in comparison to prior art frames that tend to be comprised of plate-like members. This helps to limit plastic deformation of the cab structure and thus helps to ensure the safety of the human operator during a roll-over event.

Due to its relatively small number of components, the frame can be made lighter and at lower cost.

The two leg design may improve access to machine components housed adjacent to the frame, and storage space in and around the frame may be larger compared to prior art frames that comprise more than two leg-like components.

The cross member may be connected to the cab structure and the legs may be connected to the chassis structure.

This assists in connecting the frame to the cab structure by providing a relatively large contact area between the frame and the cab structure.

The frame may comprise only two legs. The frame may connect to the chassis structure via the two legs exclusively.

The frame comprising only two legs helps to ensure that access to any vehicle components housed adjacent to the frame is not hindered by the frame, and that storage space in and around the frame is increased compared to prior art frames that include more than two leg-like components.

The superstructure may comprise two leg connectors, one attached to each leg, wherein each leg connector is connected to the chassis structure such that each leg connector is interposed between the body and the chassis structure. Each leg connector may comprise a flat surface abutting the chassis structure.

The leg connectors allow for a simple and secure connection between a rounded tubular body and the cab structure.

The cab structure may comprise a seat base structure for mounting a seat thereon, and the cross member may be connected to the seat base structure.

This allows the seat base structure to be independent of the roll-over protection structure of the machine. As such, the seat base structure can be made lighter and at lower cost.

An uppermost portion of the frame may be offset from a lowermost portion of the frame in a direction that is horizontal with respect to the superstructure.

This allows the frame to support a laterally extending portion of a cab structure that extends over, for example, an engine bay. The frame may then also acts as a roll cage for the engine bay.

Each leg may comprise a free end.

This allows the frame to be lighter and less costly to manufacture since the frame does not need to comprise a second cross member.

The superstructure may further comprise a compartment for accommodating one or more functional components such as an internal combustion engine, an electric motor and/or a battery mounted upon the chassis structure, wherein at least a portion of the compartment is located between the cross member and the chassis structure and/or between the legs of the frame, such that the frame at least partially defines a protective housing for the one or more functional components.

This allows the frame to act as a protective roll cage for an engine or motor compartment.

The superstructure may further comprise a canopy mounted to one or more of the frame, the chassis structure and the cab structure, wherein the canopy at least partially defines the compartment and is configurable to both prevent and allow access to the compartment from outside of the superstructure.

The canopy protects the engine/motor compartment when the working machine is being operated.

The superstructure may further comprise a compartment bulkhead mounted to the frame and located within the compartment, wherein the compartment bulkhead divides a first portion of the compartment from a second portion of the compartment.

The compartment bulkhead may act to thermally insulate hot engine/motor components from components that are required to be maintained at lower temperatures, such as a radiator for example.

The frame may be mounted to an upright plate of the chassis structure.

This provides a flat mounting surface for the frame.

The upright plate may be a chassis bulkhead which divides a first portion of the chassis from a second portion of the chassis.

The chassis bulkhead may act to thermally insulate hot engine/motor components from components that are required to be maintained at lower temperatures, such as a hydraulics valve block for example.

The body may be a unitary structure.

This provides a strong and robust structure, since no potentially weakening connections are required between multiple components.

The body may be formed from a tube with a circular cross-section.

This provides the body with good elastic energy absorption properties in comparison to plastic energy absorption properties.

The body may be formed from steel.

This provides the body with high tensile strength and a high modulus of elasticity.

According to a second aspect of the present teachings, there is provided a working machine comprising a ground engaging structure and a superstructure according to the first aspect of the present teachings mounted thereon.

The superstructure may be movable relative to the ground engaging structure. For example, the working machine may be a slew excavator.

The working machine may have an operating weight of between 1 and 8 tonnes. The working machine may have an operating weight of between 1 and 5 tonnes. The working machine may have an operating weight of between 2 and 4 tonnes.

BRIEF DESCRIPTION OF THE DRAWINGS

Embodiments are now disclosed by way of example only with reference to the drawings, in which:

FIG. 3b is a side view of the frame shown in FIG. 3a;

FIG. 4b is a magnified view of the superstructure shown in FIG. 4a.

DETAILED DESCRIPTION OF EMBODIMENT(S)

Figure 1:
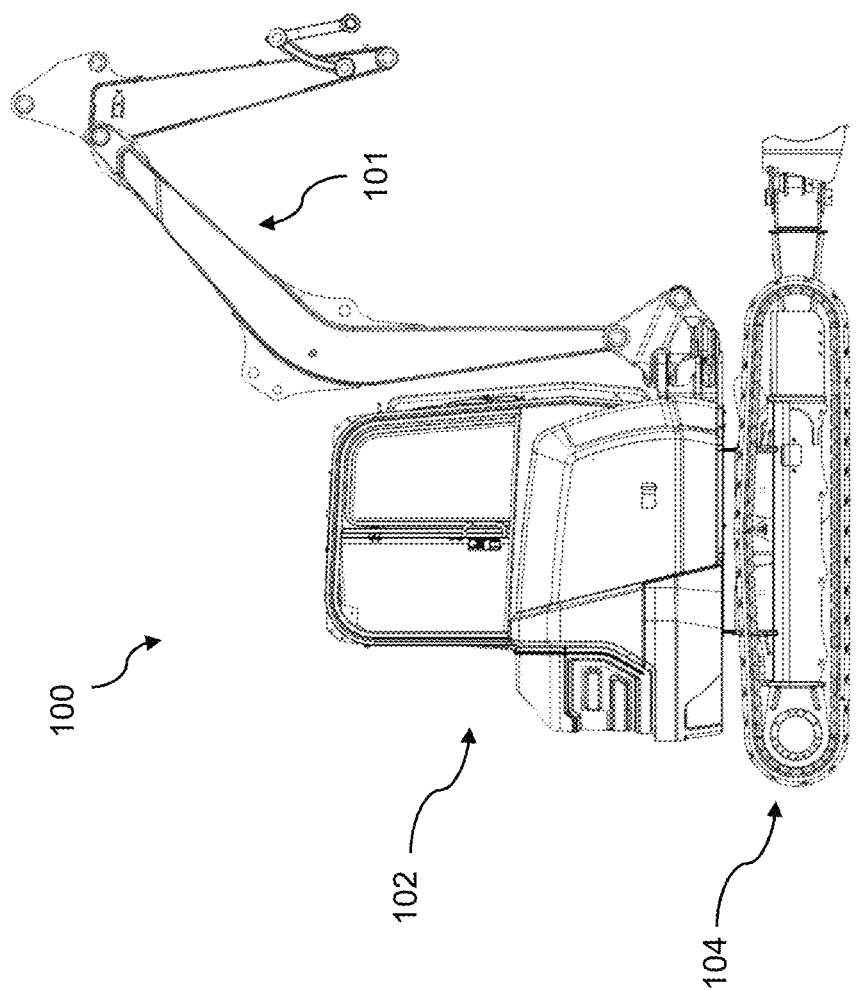
FIG. 1 is a side view of a working machine according to an embodiment.

FIG. 1 shows a side view of a working machine 100 comprising a superstructure 102 and a ground-engaging structure 104. The superstructure 102 is mounted upon the ground-engaging structure 104.

In FIG. 1, the ground-engaging structure 104 comprises a pair of continuous tracks. However, it will be appreciated that the ground-engaging structure 104 could alternatively comprise, for example, a plurality of wheels.

In the embodiment shown in FIG. 1, the superstructure 102 is movable relative to the ground-engaging structure 104. The superstructure 102 is capable of rotating with respect to the ground-engaging structure 104 about an axis that is substantially vertical in FIG. 1. In some embodiments, the superstructure 102 may be capable of pivoting through 360 degrees relative to the ground-engaging structure 104.

Alternatively, the superstructure 102 may have a substantially fixed relationship with respect to the ground-engaging structure 104.

The working machine 100 shown in FIG. 1 is a slew excavator having a working arm 101. However, the present teachings are not limited to a slew excavator and may apply to other working machines. For example, the working machine 100 could instead be a forklift, a backhoe loader, a telescopic handler, a tractor, a loader or a dumper.

In some embodiments, the working machine 100 has an operating weight of between 1 and 8 tonnes. Preferably, the working machine 100 has an operating weight of between 1 and 5 tonnes. More preferably, the working machine 100 has an operating weight of between 2 and 4 tonnes.

Figure 2:
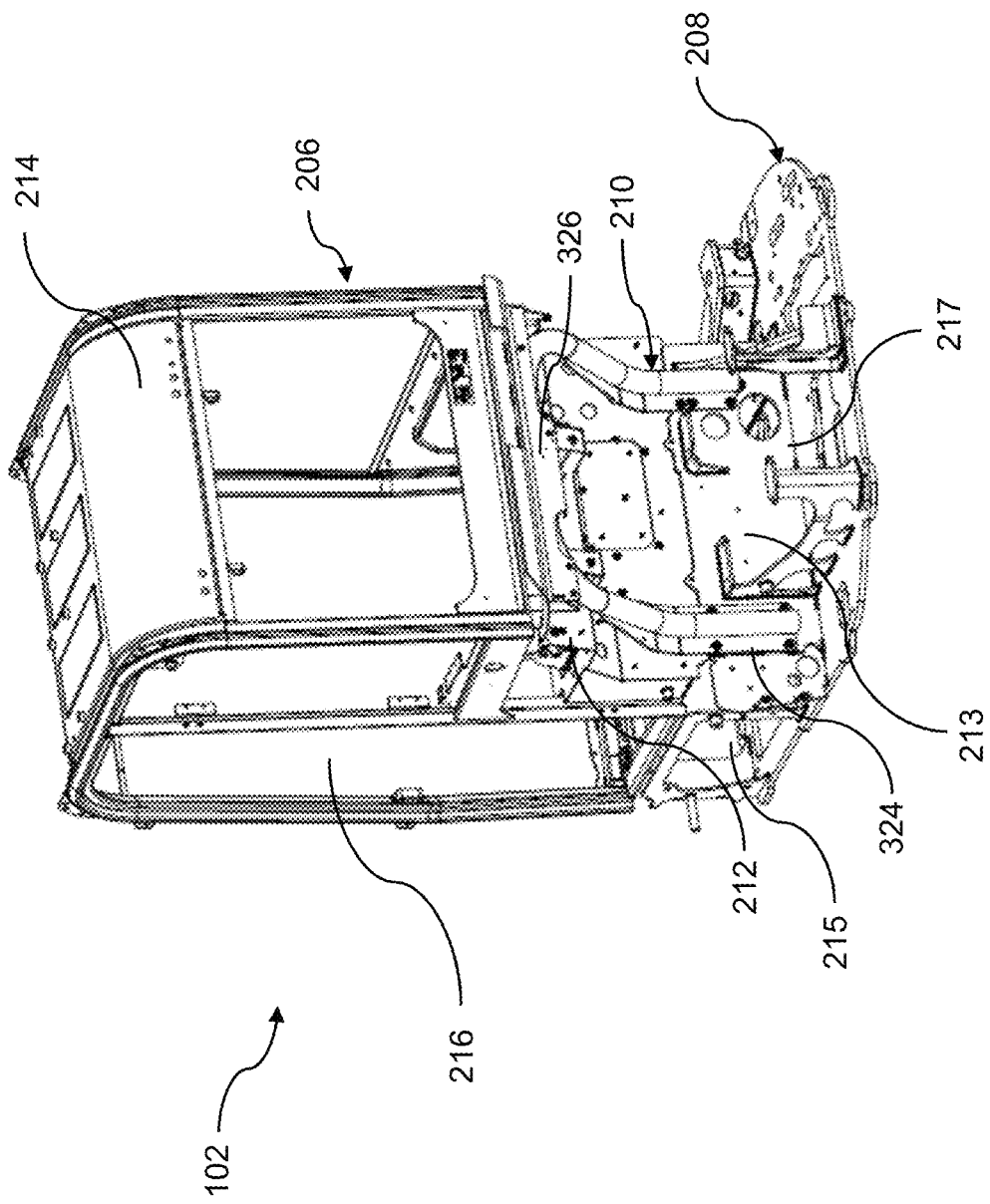
FIG. 2 is an isometric view of a superstructure according to an embodiment with various components removed for clarity.

FIG. 2 shows an isometric view of part of the superstructure 102 shown in FIG. 1 looking from the rear. The superstructure 102 comprises a cab structure 206, a chassis structure 208 and a frame 210. The chassis structure 208 provides a base for the cab structure 206 and is fabricated from sheet metal plate. In the illustrated embodiment, the cab structure 206 is directly mounted to the chassis structure 208. However, in other embodiments, another structure may be partially or wholly interposed between the cab structure 206 and the chassis structure 208.

The cab structure 206 is intended to house a human operator of the working machine 100 and comprises a seat base structure 212 and a housing structure 214 mounted to the chassis structure 208. The seat base structure 212 is also mounted to the chassis structure 208. A seat (not shown) for an operator of the working machine 100 is intended to be mounted to the seat base structure 212, such that the seat, and therefore the operator when seated, faces a front screen 216. One or more controls (not shown) for controlling the working machine 100 may also be mounted to the seat base structure 212 and/or the chassis structure 208.

The frame 210 is connected to the cab structure 206 proximate an upper extent of the frame 210, and the chassis structure 208 proximate a lower extent of the frame 210, so as to support a portion of the cab structure 206. Note, terms such as "upper", "lower", "horizontal" and "vertical" are defined with respect to the working machine 100 during its normal operation on level ground.

The chassis structure 208 comprises an upright plate 213 to which the frame 210 is mounted. In particular, the lower extent of the frame 210 is mounted to the plate 213. In the illustrated embodiment, the plate 213 acts as a chassis bulkhead which divides a first portion of the chassis structure 208 from a second portion of the chassis structure 208. In particular, the plate 213 separates a front compartment 215, which is in front of the plate 213 in FIG. 2, from a rear compartment 217, which is in behind the plate 213 in FIG. 2.

In some embodiments, the plate 213 thermally insulates one compartment 215, 217 from the other compartment 215, 217. For example, the rear compartment 217 may house an internal combustion engine (see FIG. 4b, 440) and the front compartment 215 may house components that are desirably maintained at temperatures below the temperature of the engine, such as a hydraulics valve block (not shown) for example. The plate 213 (optionally, with insulation mounted thereto) may act to reduce the rate of heat transfer from the rear compartment 217 to the front compartment 215. This helps to ensure that the temperature of the front compartment 215 is less than the temperature of the rear compartment 217.

It can be seen in FIG. 2 that the rear portion of the cab structure 206, i.e. the portion of the cab structure that opposes the front screen 216, extends horizontally over a portion of the rear compartment 217 of the chassis structure 208.

Figure 4A:
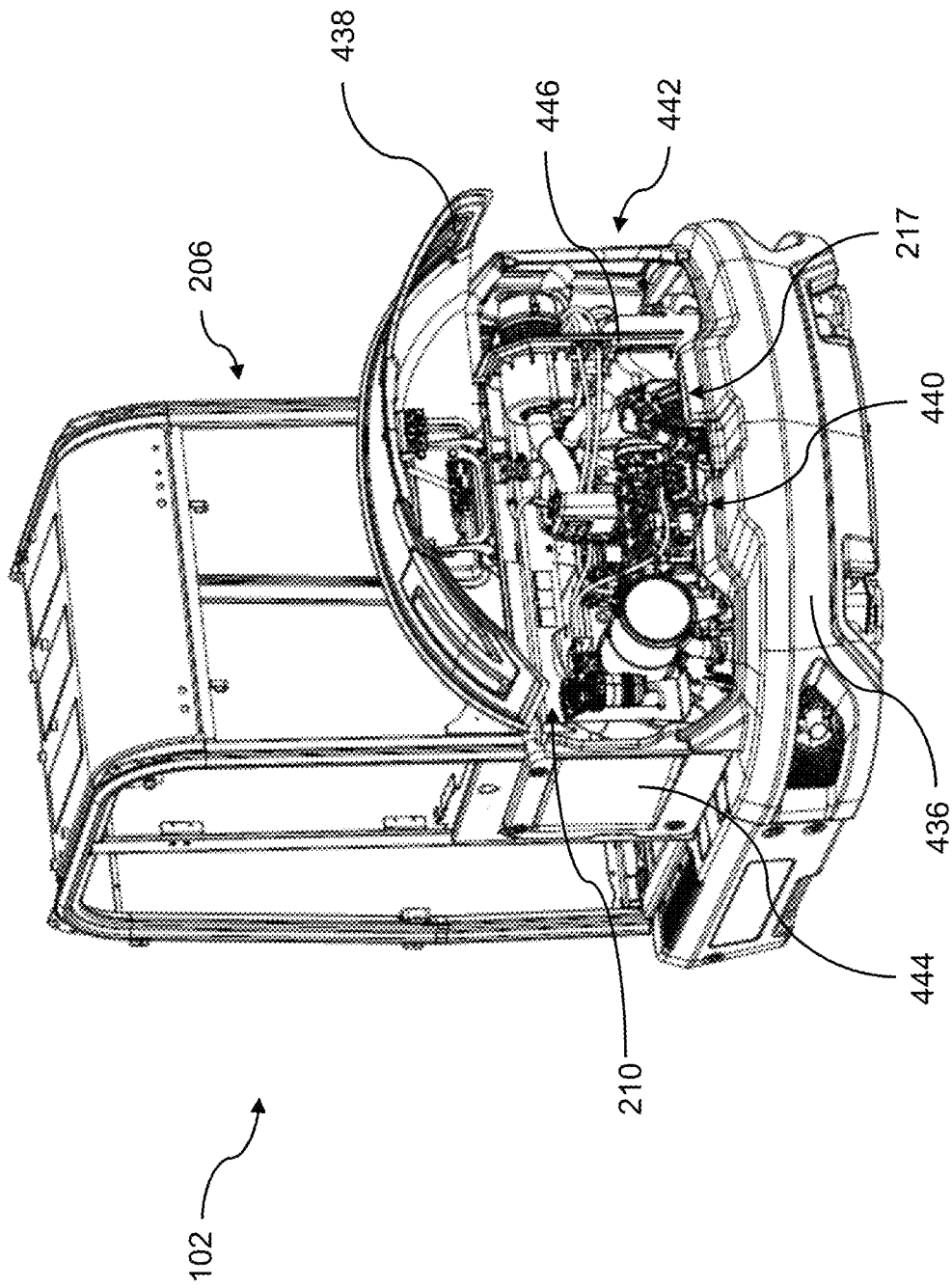
FIG. 4a is an isometric view of a superstructure according to an embodiment.
Figure 4B:
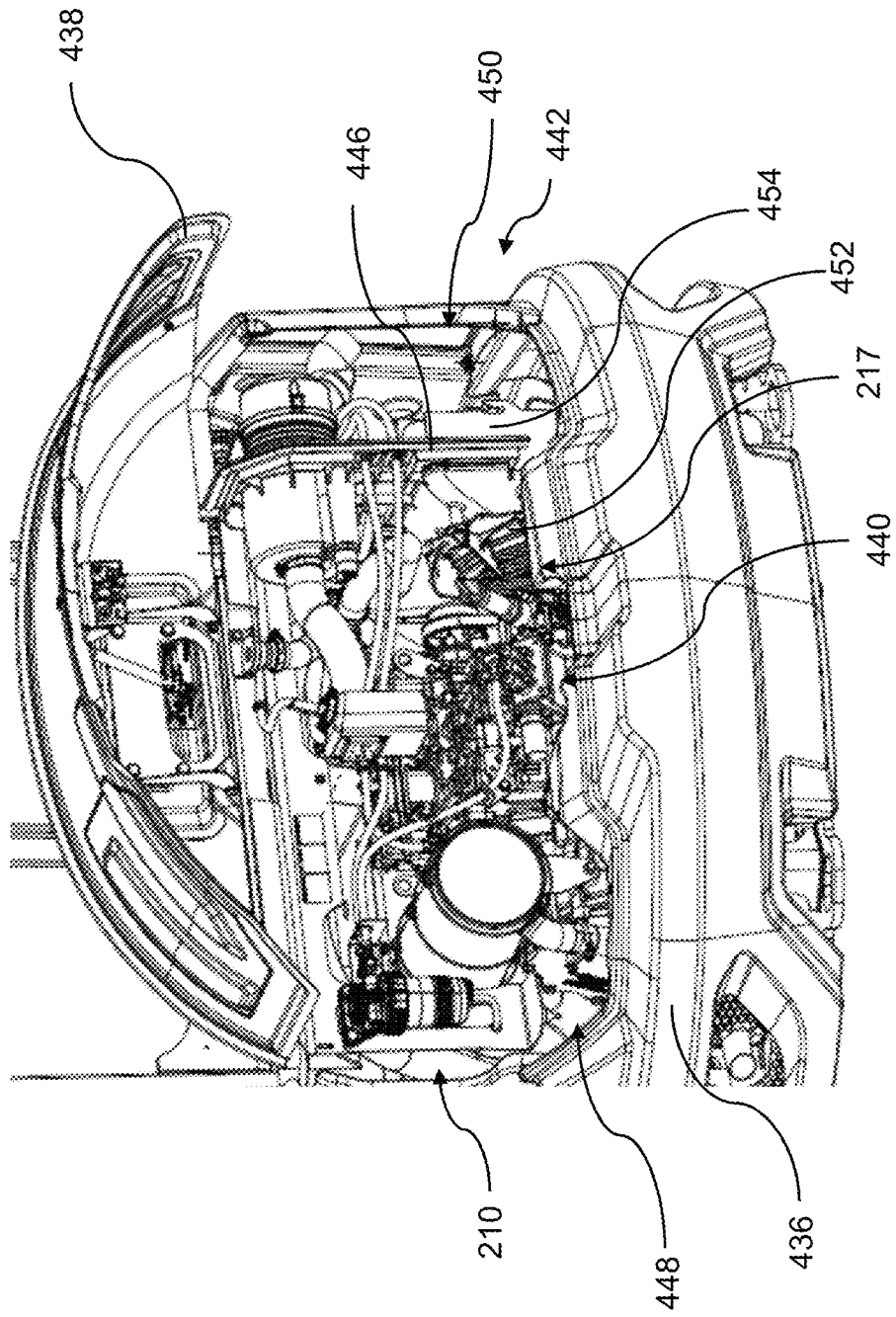

In the particular embodiment, the seat base structure 212 partially defines the horizontally extending portion of the cab structure 206. By extending the rear portion of the cab structure 206 horizontally, space is provided between the seat base structure 212 and the chassis structure 208 for accommodating one or more functional components such as an internal combustion engine, an electric motor and/or a battery, as shown in FIGS. 4a and 4b and as will be discussed more in the following.

Figure 3B:
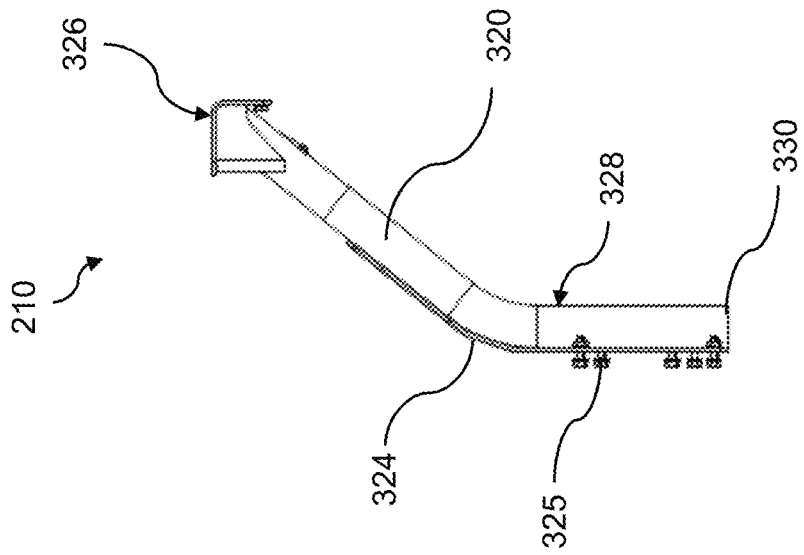
Figure 3A:
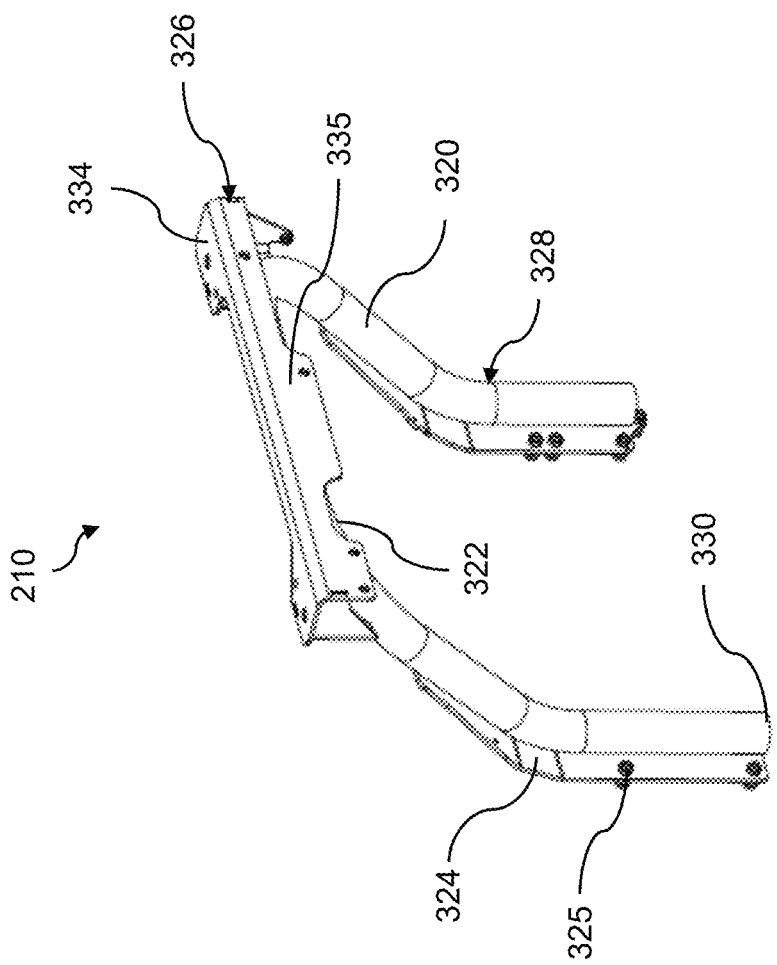
FIG. 3a is a rear isometric view of a frame according to an embodiment.
Figure 3C:
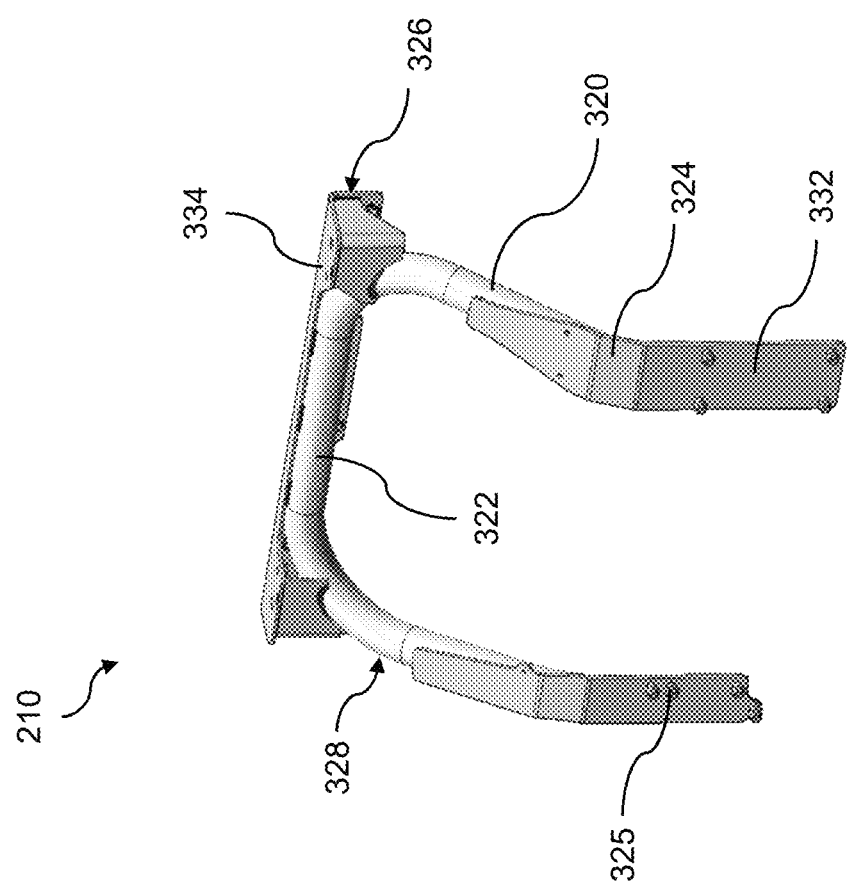
FIG. 3c is a front isometric view of the frame shown in FIGS. 3a and 3b.

With reference to FIGS. 3a-3c, the frame 210 comprises a tubular body 328, which comprises two legs 320 and a cross-member 322 interposed between the legs 320. The cross-member 322 is at a non-zero angle to both legs 320. The frame 210 also comprises two leg connectors 324 and a cross-member connector 326. One leg connector 324 is attached to each leg 320, and the cross-member connector 326 is attached to the cross-member 322.

In the illustrated embodiment, the legs 320 are substantially perpendicular to the cross-member 322. This results in the tubular body 328 being substantially U-shaped. However, in other embodiments, the angle between each leg 320 and the cross-member 322 may be less than or greater than ninety degrees. Alternatively or additionally, the legs 320 may be orientated at different angles to the cross-member 322 in relation to each other.

In the illustrated embodiment, the tubular body 328 is a unitary structure, i.e. it has been formed as a single component. Further, the tubular body 328 is formed from a tube with a hollow circular cross-section, and is formed from steel. It has been found that providing the tubular body 328 with a circular cross-section allows the tubular body 328 to absorb more energy through elastic deformation in comparison to other shaped cross-sections.

However, in other embodiments, the tubular body 328 may not be a unitary structure, and may instead be formed from several components connected together, e.g. by welding. Alternatively or additionally, the tubular body 328 may be formed from a tube having a non-circular cross-section, such as an oval or square-shaped cross-section for example. Alternatively or additionally, the tubular body 328 may be formed from a material other than steel, such as aluminium for example.

In FIGS. 3a-3c, each leg 320 comprises a free end 330, i.e. a terminating portion of the tubular body 328. However, in other embodiments, neither leg 320 comprises a free end 330. For example, the legs 320 may be connected via a second cross-member such that the tubular body 328 has the form of a continuous loop.

In the illustrated embodiment, the frame 210 comprises two legs 320 only. However, in other embodiments, the frame 210 may comprise more than two legs 320.

With reference to FIGS. 2 and 3a-3c, it can be seen that an uppermost portion of the frame 210 is offset from a lowermost portion of the frame 210 in a direction that is horizontal with respect to the superstructure 102. In the illustrated embodiment, the uppermost portion of the frame 210 corresponds to the cross-member 322 and the cross-member connector 326, and the lowermost portion of the frame 210 corresponds to the free ends 330 of the legs 320. In FIG. 2, it can be seen that the uppermost portion of the frame 210 is offset from the lowermost portion of the frame 210 in a direction that is horizontal with respect to the superstructure 102 and which corresponds substantially to the direction in which the rear portion of the cab structure 206 extends. This allows the frame 210 to follow the contours of the rear of the cab structure 206 and to support the extending portion of the cab structure 206.

In FIGS. 3a-3c, it can be seen that each leg 320 comprises a first portion and a second portion which is at a non-zero angle to the first portion. This is achieved by bending each leg 320 at a knee portion. It is these bends that result in the uppermost portion of the frame 210 being horizontally offset from the lowermost portion of the frame 210.

With reference to FIG. 2, it can be seen that the cross-member 322 is connected to the cab structure 206 and the legs are connected to the chassis structure 208. In particular, the cross-member 322 is connected to the seat base structure 212 and the housing structure 214 of the cab structure 206. Connected as such, the frame 210 is able to transfer the mass of the extending portion of the cab structure 206, including the seat base structure 212, to the chassis structure 208 and hence is able to support the extending portion of the cab structure 206.

In the illustrated embodiment, the frame 210 connects to the chassis structure 208 via the two legs 320 exclusively. However, in other embodiments, for example in which the frame 210 comprises more than two legs 320, the frame 210 may connect to the chassis structure 208 via three or more legs 320. For example, an additional leg may be provided intermediate the first and second legs 320, and have a similar shape to also mount to the upright plate 213.

Alternatively, the frame 210 may connect to the chassis structure 208 via the cross-member 322.

In the illustrated embodiment, the legs are connected to the chassis structure 208 via the leg connectors 324. Each leg connector 324 is connected to the chassis structure 208 such that each leg connector 324 is interposed between the tubular body 328 and the chassis structure 208. As best seen in FIGS. 2 and 3c, each leg connector 324 comprises a flat surface 332 that abuts the chassis structure 208. As best seen in FIG. 2, the flat surfaces 332 abut and are mounted to the upright plate 213 comprised on the chassis structure 208 using suitable fasteners such as bolts 325. The leg connectors 324 provide a secure connection between the tubular body 328 and the chassis structure 208.

In the illustrated embodiment, the leg connectors 324 are formed from steel. However, the leg connectors 324 may be formed from any suitable metallic material such as aluminium for example.

In the illustrated embodiment, the leg connectors 324 are attached to the legs 320 via welds. However, in other embodiments, the leg connectors 324 may be, for example, clamped, glued, bolted and/or riveted to the legs 320.

As best shown in FIG. 3b, each leg connector 324 comprises three planar portions, wherein each planar portion is at a non-zero angle to the other two planar portions. Each planar portion abuts an outer surface of the leg 320 to which it is connected. Only the lower-most planar portion, comprising flat surface 332, is connected to the chassis structure 208. The two upper-most planar portions of each leg connector 324 act to increase the strength and the stiffness of the leg 320 to which it is connected.

In other embodiments, each leg connector 324 may comprise one, two or more than three planar portions. Alternatively or additionally, more than one planar portion of each leg connector 324 may be connected to the chassis structure 208 and/or the cab structure 206 (e.g. the seat base structure 212). Alternatively or additionally, each leg connector 324 may comprise one or more non-planar portions. For example, each leg connector 324 may comprise one or more portions that are shaped to conform to the outer surface of the leg 320 to which it is attached.

With reference to FIG. 2, it can be seen that the cross-member connector 326 is connected to the cab structure 206 such that the cross-member connector 326 is interposed between the frame tubular body 328 and the cab structure 206. As best seen in FIGS. 2, 3a and 3c, the cross-member connector 326 comprises a flat surface 334 that abuts the cab structure 206. In the illustrated embodiment, the cross-member connector's flat surface 334 abuts and is mounted to the seat base structure 212 and the housing structure 214. The cross-member connector 326 provides a secure connection between the tubular body 328 and the cab structure 206.

As best shown in FIG. 3a, the cross-member connector 326 comprises a flat vertical rear-facing surface 335. In some embodiments, components such as, for example, a fuel filter may be mounted to the flat vertical rear-facing surface 335.

In the illustrated embodiment, the cross-member connector 326 is formed from steel. However, the cross-member connector 326 may be formed from any suitable metallic material such as aluminium for example.

In the illustrated embodiment, the cross-member connector 326 is attached to the cross-member 322 via welds. However, in other embodiments, the cross-member connector 326 may be, for example, clamped, glued, bolted and/or riveted to the cross-member 322.

In other embodiments, the leg connectors 324 and/or the cross-member connector 326 may not be required. For example, holes for fasteners such as bolts 325 may be provided directly in the tubular body 328.

It can be seen in FIG. 2 that the frame 210 supports the horizontally extending portion of the cab structure 206 by transferring the mass of the horizontally extending portion of the cab structure 206 to the chassis structure 208. Advantageously, the frame 210 also supports and protects the cab structure 206 in a roll-over event.

If the working machine 100 and therefore the superstructure 102 were to roll-over in an adverse scenario, a side portion of the cab structure 206 may hit the ground. In such an event, the frame 210 is able to transfer the impact loading experienced by said side portion of the cab structure 206 to the chassis structure 208. Further, the frame tubular body 328 is capable of elastically deforming during the impact, which efficiently absorbs the impact energy. The frame 210 is therefore able to limit plastic deformation of the cab structure 206 in a roll-over event. This is advantageous since an operator housed in the cab structure 206 may be at risk if the cab structure 206 were to deform considerably.

A roll-over protection structure (ROPS) test measures the amount of plastic deformation of a structure in a roll-over event. It has been found from a standard ROPS test of the superstructure 102 that plastic deformation of the cab structure 206 is below 10%.

FIGS. 4a and 4b show a perspective view of the superstructure 102 shown in FIG. 2 further comprising an internal combustion engine 440 and its related components mounted upon the chassis structure 208. The engine 440 and its related components are accommodated within the superstructure's rear compartment 217. As best seen in FIG. 2, at least a portion of the rear compartment 217 is located between the cross-member 322 and the chassis structure 208 and between the legs 320 of the frame 210. As such, the frame 210 at least partially defines a protective housing for the engine 440. In effect, the frame 210 acts as a partial roll-cage which affords some protection to the engine 440 in the event that the superstructure 102 rolls onto one of its sides.

In some embodiments, the rear compartment 217 comprises one or more functional components in addition to or instead of an engine 440, such as an electric motor and/or a battery, for example. In such embodiments, the working machine 100 may be hybrid electric/internal combustion engine powered or solely electrically powered for example.

In some embodiments, a portion of the rear compartment 217 is located between the cross-member 322 and the chassis structure 208 and not between the legs 320 of the frame 210. In other embodiments, a portion of the rear compartment 217 is located between the legs 320 of the frame 210 and not between the cross-member 322 and the chassis structure 208.

With respect to FIG. 2, the superstructure 102 shown in FIGS. 4a and 4b further comprises a canopy 442. The canopy 442 partially defines the rear compartment 217 and comprises a skirt 436, side walls 444 and a hatch 438.

The hatch 438 is configurable to both prevent and allow access to the rear compartment 217 from outside of the superstructure 102. When the hatch 438 is an open state, as shown in FIGS. 4a and 4b, the rear compartment 217 is accessible from outside of the superstructure 102, such that the engine 440 may be serviced, inspected or repaired. When the hatch 438 is in a closed state, as shown in FIG. 1, the rear compartment 217 is not accessible from outside of the superstructure 102. In its closed state, the hatch 438 protects and shields the engine 440 from the external environment.

In the illustrated embodiment, the hatch 438 is mounted to the cab structure 206 via hinges. In particular, the hatch 438 is mounted to the frame 210 via the cross-member connector 326. The hatch 438 may be formed from any suitable material, such as for example, a metallic material, a plastics material or a composite material.

The hatch 438, the side walls 444, the skirt 436, the chassis structure 208 and the cab structure 206 together form an enclosed protective housing for the engine 440, when the hatch 438 is in the closed state.

In some embodiments, the canopy 442 is mounted to one or more of the frame 210, the chassis structure 208 and the cab structure 206. For example, the hatch 438, the skirt 436 and the side walls 444 may be mounted to the frame 210.

With respect to FIG. 2, the superstructure 102 shown in FIGS. 4a and 4b further comprises a compartment bulkhead 446 mounted to the frame 210 and located within the rear compartment 217. As best seen in FIG. 4b, the compartment bulkhead 446 divides a first portion 448 of the rear compartment 217 from a second portion 450 of the rear compartment 217. In particular, the compartment bulkhead 446 divides a first portion 448 of the rear compartment 217 that accommodates the engine 440, i.e. to the left of the bulkhead 446 in FIGS. 4a and 4b, from a second portion 450 of the rear compartment 217 to the right of the bulkhead 446 in FIGS. 4a and 4b.

In the illustrated embodiment, the compartment bulkhead 446 is an upright wall comprising multiple apertures that allow the passage of multiple functional components through the bulkhead 446 from the first portion 448 to the second portion 450. Such functional components may include, for example, electrical wiring, liquid transport lines such as fuel or oil lines, and/or gas transport lines such as engine intake air or engine exhaust lines.

In the illustrated embodiment, a fan 452 is mounted to the engine so as to rotate within the compartment bulkhead 446. Further, a radiator 454 is located within the second portion 450. The fan 452 and the radiator 454 both act to cool the engine 440.

In some embodiments, the compartment bulkhead 446 thermally insulates the first portion 448 from the second portion 450. For example, the second portion 450 may house components that are required to be maintained at temperatures below the temperature of the engine 440, such as the radiator 454 for example. The compartment bulkhead 446 may act to reduce the rate of heat transfer from the first portion 448 to the second portion 450. This helps to ensure that the temperature of the second portion 450 is less than the temperature of the first portion 448.

In the illustrated embodiment, the compartment bulkhead 446 is mounted to the flat vertical rear-facing surface 335 of the cross-member connector 326. However, in other embodiments, the compartment bulkhead 446 may be mounted to one of the legs 320 of the frame 210 in addition to or instead of being mounted to the cross-member connector 326.

Advantageously, the frame 210 acts as a datum for components of the superstructure 102 and components related to the engine 440. In the embodiment illustrated in FIGS. 4a and 4b, the frame 210 acts as a datum for, among other components, the canopy 442, the cab structure 206, the compartment bulkhead 446, and several components related to the engine 440 (e.g. a fuel filter).

In alternative embodiments (not shown), the chassis structure 208 may comprise a counterweight located proximate to the rear portion of the cab structure 206, for example within or adjacent to the rear compartment 217. The counterweight may extend towards the rear or the chassis. The counterweight may be in the form of a volume of high density material such as cast iron or steel which acts to counterbalance loads lifted by the working arm to inhibit the superstructure 102 from tipping forward when the working arm 101 extends away from the superstructure 102. In such embodiments, the frame 210 may be connected to the counterweight at least in part. For example, at least one of the legs 320 and/or the cross-member 322 may be connected to the counterweight via any of the connection arrangements previously described.

The invention claimed is:

1. A superstructure for mounting upon a ground engaging structure of a working machine, the superstructure comprising:
   a cab structure for housing a human operator of the working machine;
   a chassis structure providing a base for the cab structure; and
   a frame comprising a tubular body, the tubular body comprising two legs and a cross member interposed between the legs, wherein the cross member is at a non-zero angle to both legs,
   wherein, when the cab structure is vertically oriented, the frame is connected to the cab structure proximate an upper extent of the frame and is connected to the chassis structure proximate a lower extent the frame so as to support a portion of the cab structure.

2. The superstructure of claim 1, wherein the cross member is connected to the cab structure and the legs are connected to the chassis structure.

3. The superstructure of claim 2, wherein the frame comprises only two legs.

4. The superstructure of claim 2, further comprising two leg connectors, one attached to each leg, wherein each leg connector is connected to the chassis structure such that each leg connector is interposed between the body and the chassis structure.

5. The superstructure of claim 2, further comprising a cross member connector attached to the cross member, wherein the cross member connector is connected to the cab structure such that the cross member connector is interposed between the tubular body and the cab structure.

6. The superstructure of claim 2, wherein the cab structure comprises a seat base structure for mounting a seat thereon, and wherein the cross member is connected to the seat base structure.

7. The superstructure of claim 1, wherein an uppermost portion of the frame is offset from a lowermost portion of the frame in a direction that is horizontal with respect to the superstructure.

8. The superstructure of claim 1, wherein each leg comprises a free end.

9. The superstructure of claim 1, further comprising a compartment for accommodating one or more functional components such as an internal combustion engine, an electric motor and/or a battery mounted upon the chassis structure, wherein at least a portion of the compartment is located between the cross member and the chassis structure and/or between the legs of the frame, such that the frame at least partially defines a protective housing for the one or more functional components.

10. The superstructure of claim 9, further comprising a canopy mounted to one or more of the frame, the chassis structure and the cab structure, wherein the canopy at least partially defines the compartment and is configurable to both prevent and allow access to the compartment from outside of the superstructure.

11. The superstructure of claim 9, further comprising a compartment bulkhead mounted to the frame and located within the compartment, wherein the compartment bulkhead divides a first portion of the compartment from a second portion of the compartment.

12. The superstructure of claim 1, wherein the frame is mounted to an upright plate of the chassis structure.

13. The superstructure of claim 12, wherein the upright plate is a chassis bulkhead which divides a first portion of the chassis from a second portion of the chassis.

14. The superstructure of claim 1, wherein the tubular body is a unitary structure.

15. The superstructure claim 1, wherein the tubular body is formed from a tube with a circular cross-section.

16. The superstructure of claim 1, wherein the body is formed from steel.

17. A working machine comprising a ground engaging structure and a superstructure mounted thereon, the superstructure comprising:
- a cab structure for housing a human operator of the working machine;
- a chassis structure providing a base for the cab structure; and
- a frame comprising a tubular body, the tubular body comprising two legs and a cross member interposed between the legs, wherein the cross member is at a non-zero angle to both legs,
- wherein the frame is connected to the cab structure proximate an upper extent of the frame and the chassis structure proximate a lower extent the frame so as to vertically support a portion of the cab structure.

18. The working machine of claim 17, wherein the superstructure is movable relative to the ground engaging structure.

19. The working machine of claim 18, wherein the working machine is a slew excavator.

20. The working machine of claim 17, wherein the working machine has an operating weight of between 1 and 8 tons.

* * * * *